Figure 1:
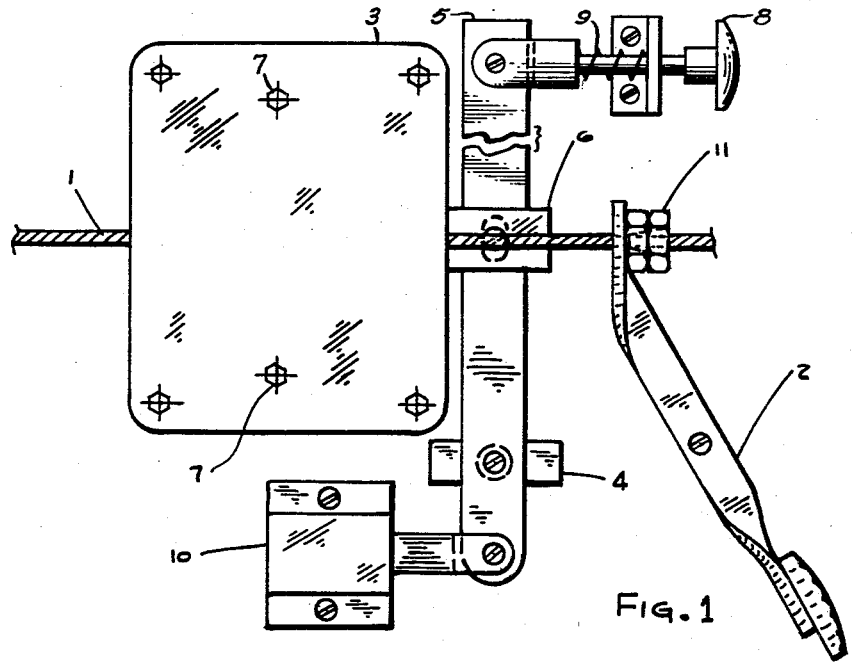

Aug. 4, 1964

P. P. BUCHANAN 3,143,192

BRAKE MECHANISM

Filed April 24, 1961

4 Sheets-Sheet 1

INVENTOR
Perry P. Buchanan
BY

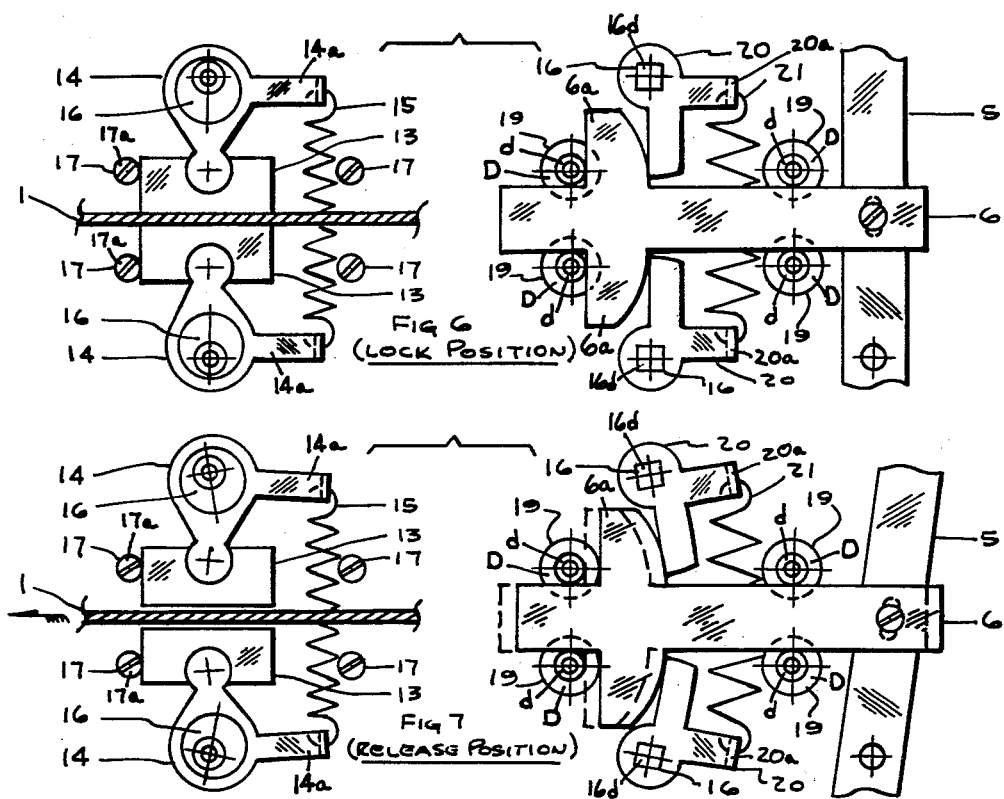

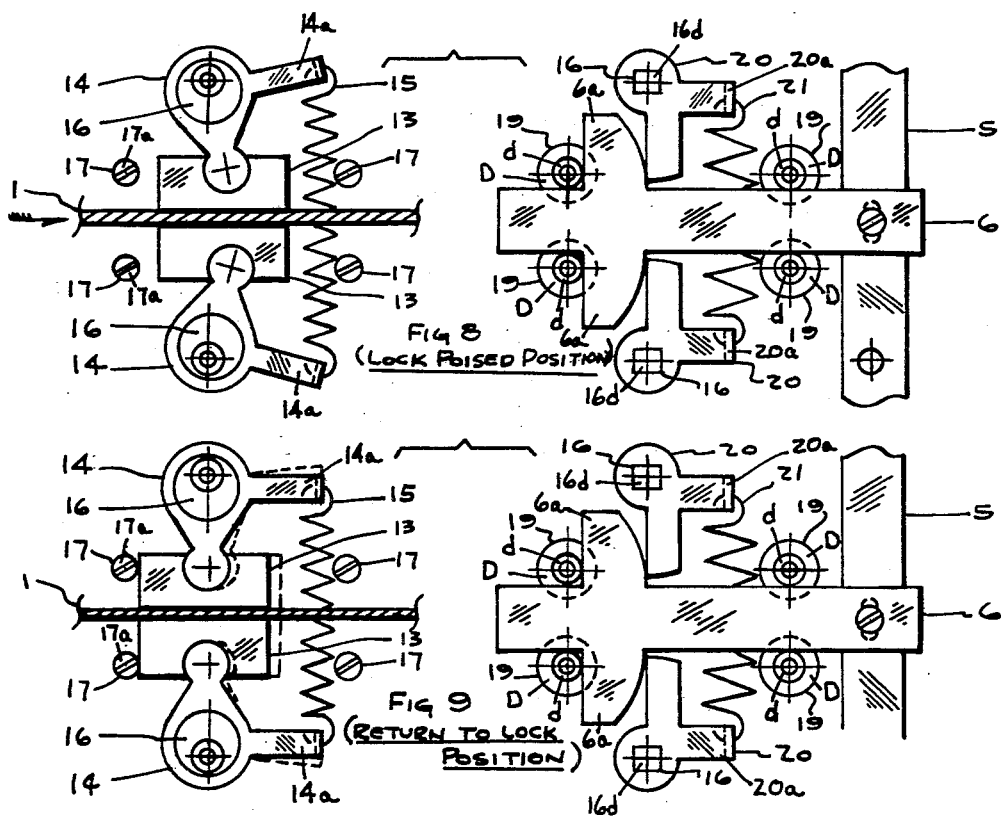

United States Patent Office 3,143,192
Patented Aug. 4, 1964

3,143,192
BRAKE MECHANISM
Perry P. Buchanan, Royal Oak, Mich.
(828 W. 14 Mile Road, Clawson, Mich.)
Filed Apr. 24, 1961, Ser. No. 104,980
8 Claims. (Cl. 188—65.1)

The invention relates to mechanism control devices and more particularly to improvements in a self-actuating brake lock mechanism in which a powerful friction lock is created without the use of ratchet teeth, inclined plane roller or ball locks, or the canted flat plate "transom" type lock, any of which has often been utilized in such a device.

The powerful friction lock is created by the action of one or more lever-actuated pressure shoes acting directly on a moving tension-loaded wire cable or similar rod-like means of conveying linear forces. A smooth release of this powerful friction lock is made possible by the fact that the outer end of the lock shoe lever arm pivots around the eccentric throw of a crank shaft type release cam. When the release slide is actuated, either manually or by some power device, the release eccentric cam is turned so that the throw moves outward, thereby effecting a smooth release of the locking pressure which was previously exerted on the brake actuation cable by the locking arms and shoes when the cam throw was in an inboard position.

The objects of the improvements are, first, to provide a safer self-actuating powerful locking device which features a silent engagement and is free from the objectionable ratchet noise characteristic of many similar devices.

Second, to provide an automatic tension adjustment feature, in that the lock mechanism will self-actuate at any time the linear motion of the cable upon which it acts attempts reverse motion and, further, will do this at any point of cable travel range which becomes functionally necessary during the entire operational life of the device.

Third, the manufacturing cost will be substantially lower than that which exists for comparable devices currently in use, since this mechanism will act directly on an existing brake cable or other like means of conveying linear force, without the need for the complex added parts usually required to make such a device functional.

Fourth, the device is self-adjusting in infinitely small increments and presents a nearly perfect condition for compensation of both brake drum lining and brake release mechanism wear while in service. This is true in the case of the mechanism, since only a slight interference action between the moving cable and a completely smooth shoe is required to self-energize the locking condition. Further, the locking shoes move with the cable while the lock squeeze pressure is being developed, therefore no slip action is present between shoes and cable. Lastly, the release cam action provides an instantaneous release of the shoe pressure on the cable and no scuffing or wearing of the cable or lock shoe will be encountered.

Fifth, when the lock shoe squeeze is applied against a wire cable, the natural characteristic of the multi-strand structure of the wire cable serves as a resilient member to absorb the powerful locking squeeze without ever incurring permanent deformation, damage, or wear to the cable.

Figure 2:
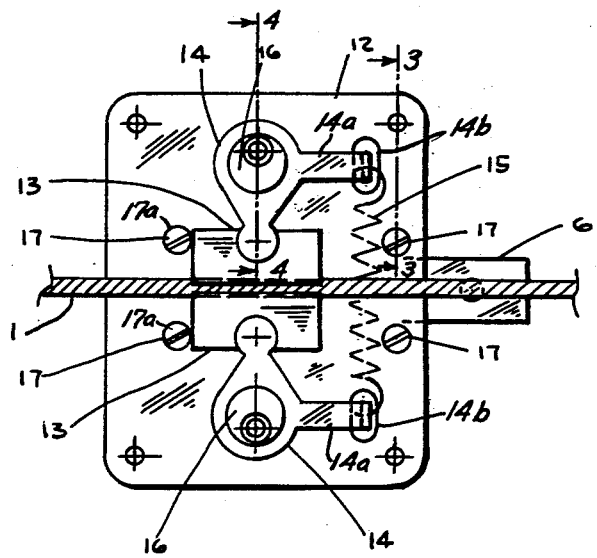
Figure 3:
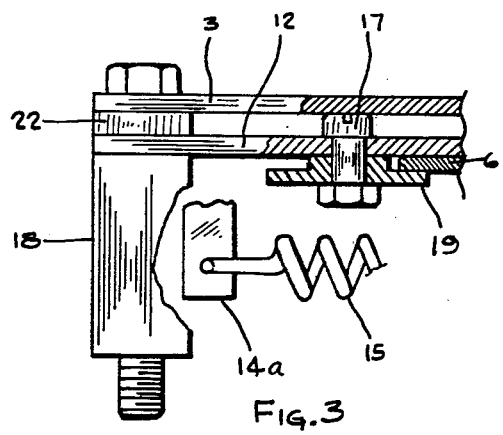
Figure 4:
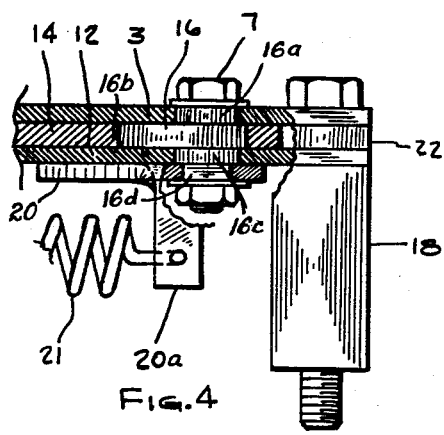
Figure 5:
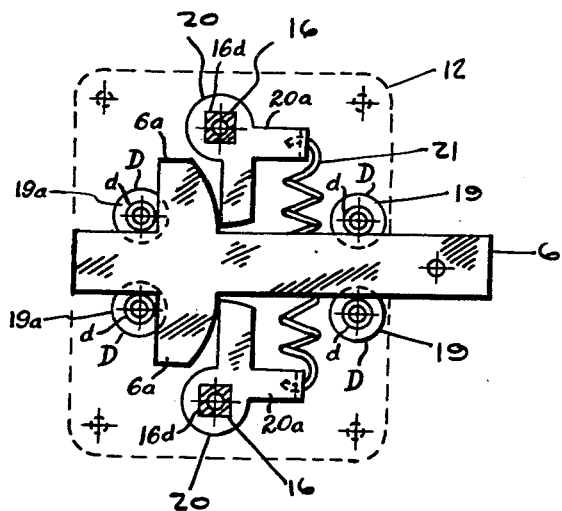

One form of the invention is illustrated in the accompanying drawings, in which FIGURE 1 is a general plan view of the prototype model. FIGURE 2 is a plan view with the cover plate and operating levers removed to show the simplicity of the locking function. FIGURE 3 is a partial side elevation sectional view taken substantially on the line 3—3 of FIGURE 2. FIGURE 4 is a partial side elevation sectional view taken substantially on the line 4—4 of FIGURE 2. FIGURE 5 is a plan view of the lock release mechanism. In addition, FIGURES 6, 7, 8, and 9 are schematic views which illustrate a complete operational cycle are shown.

In detail, FIGURE 1 is a plan view of the device which exhibits such broad features of the mechanism as the brake actuating cable 1. A conventional foot-operated pivoted lever 2 which applies tension to the brake actuating cable 1 when foot pressure is applied. The upper cover plate 3 and the anchor plate 12 encase the key operating parts of the device. A stationary mounted post 4 upon which the release actuator bar 5 pivots when actuated to create an outward sliding movement of the cam release actuator slide 6 which, as will be shown in subsequent views, results in instantaneous release of the locking pressure applied to the cable 1. Also shown in FIGURE 1 is a conventional hand pull lever 8, which is spring loaded 9 to return to its original position, and a power operating device 10, in this case an electric solenoid. These lock release control devices, 8 and 10, are attached to opposite ends of the release actuator bar 5 to energize the lock release function upon demand by the operator. Referring back to the fourth object of improvement, that is, compensation for wear, a standard cable jam lock nut 11 is shown tightened over the terminal end of the cable. In this maner adjustment to re-establish the proper range of the foot-operated pivot lever 2 can be readily made from inside the vehicle if cable stretch or other maladjustment has occurred in service.

In detail, FIGURE 2 is a plan view with the upper cover plate 3 removed to better exhibit the operating parts of the locking function. The second of the two plates which encase the key parts of the friction lock is shown as the anchor plate 12. The friction lock shoes 13 are flat stampings with a radius coined on the inboard face to provide a contour fit to the diameter of the brake actuating cable 1. An arcuate aperture is provided opening through the side wall of each shoe 13 to provide a female seat for the male diameter on the inboard ends of the lock shoe lever arms 14. Shown in hidden lines is a single low pressure lock shoe lever arm spring 15 connected to the respective extremities of arms 14 and biasing the arms in a direction to maintain the slight pressure on the cable 1 required to energize the friction lock function. This spring 15 attaches to the downstanding legs 14a of the pressure shoe actuating lever 14 which protrude through the elongated slots 14b shown in the anchor plate 12. The stamped levers 14 have a clearance hole which is a slip fit over the eccentric throw of the crank shaft type release cam 16. This cam 16 is a screw machine part with a bearing journal 16a which is a slip fit in a hole in the cover plate 3—an eccentric throw diameter 16b which is a slip fit in a hole in the lock shoe lever arms 14—a bearing journal 16c which is a slip fit in a hole in the anchor plate 12—the lower bearing journal in the anchor plate is extended so that a square portion 16d may be milled on the cam to engage with the release mechanism arms shown in later views. A hole is drilled through each cam to permit insertion of the bolts 7 shown in FIGURE 4 used to retain the release cams. The release slide retaining bolts 17 will be better shown in later views. It will be noted that the heads 17a of the two left-hand release slide retaining bolts 17 are so positioned (see FIG. 6 for example) as to provide a rigid stop for each friction lock shoe 13.

In detail, FIGURE 3 is a partial side elevation view which exhibits the conventional pedestal structure 18 used to mount the device and a cross section through one of the four cam release slide retaining spools 19 used to hold the cam release slide 6 to the bottom side of the anchor plate 12. Partially shown is a view of the downstanding leg 14a of the lock shoe lever arm 14 to which is attached the lock shoe lever arm spring 15, as shown in FIGURE 2, required to energize the friction lock function. Also shown in this view is one of the four plate spacer washers 22 used to keep the plates 3 and 12 separated enough to provide adequate clearance for the working parts encased therebetween.

In detail, FIGURE 4 is a partial side elevation view which shows a cross section through the release cam 16 including the square area milled on the extended lower journal over which a square hole formed in the release cam actuating lever 20 fits. Spring pressure is applied to the actuating levers 20 in the unlocked position by the release cam return spring 21 shown attached to both of the legs 20a of the release cam actuating levers 20, as shown in FIGURE 5, biasing the release cams 16 toward the position shown in FIGURE 2 which is an inboard position when free.

In detail, FIGURE 5 is a plan view of the release mechanism parts which are attached to the bottom side of the anchor plate 12 shown in phantom in this figure. The major diameter D of the two pairs of cam release retaining spools 19 and 19a is used to establish a clearance fit and hold the cam release actuator slide 6 up against the bottom side of the anchor plate 12. The minor diameter d of each of the spools 19 and 19a serves as guide means and prevents excessive sideways movement as the cam release slide 6 is pulled outward to effect friction lock release. This release is effected, as will be illustrated in the operational sequence description which follows, when the outboard arms 6a of the cam release slide 6 engage the release cam actuating levers 20 which, in turn, rotates the release cam 16 by turning the cam shown cross hatched in FIGURE 5.

FIGURES 6, 7, 8 and 9 show the lock mechanism and the release mechanism in four different positions of operation, as indicated by the legends adjacent the various figures. The lock mechanism is illustrated in the left-hand portion of each of these figures, while the release mechanism is shown in the right-hand portion of the various figures. The sequential operation of the brake mechanism will now be described with reference to FIGURES 6, 7, 8 and 9. FIGURE 6 shows the brake mechanism in "lock" position, wherein the cams 16 are rotated on their eccentric shafts to a position shifting the lever arms 14 and their associated lock shoes 13 into engagement with the brake actuating cable 1. In this position, the cable 1 is tightly grippingly held between the lock shoes 13 against movement to the left as shown in FIGURE 6. Movement of the cable to the right as shown in FIGURE 6, as under the influence of operating lever 2, would occur in the same manner as hereinbelow described with reference to FIGURE 8.

FIGURE 7 is shown in "release" position. When the cam release actuator slide 6 was pulled in a right-hand direction as viewed in FIGURE 7, the outboard arms 6a engaged the legs 20a of the release cam actuating levers 20 which in turn rotated the eccentric throw 16b of the release cams 16 outboard and released the dimensional interference which had existed when the release cam 16 eccentric throw was closer to dead center and the lock shoe lever arms 14 were exerting squeeze pressure as shown in FIGURE 6. It will be noted that although the lock shoes 13 are against the heads 17a of one pair of the release slide retainer bolts 17 which serve as stops, these shoes will not contact the cable 1 until the manual or power actuated outward pull on the cam release actuator slide 6 is released.

In FIGURE 8, the "lock poised" position is illustrated. This condition is created by a sequence of two events. First, as the outward pull exerted by the operator on the actuator slide 6 is released, the slide return spring 9 shown in FIGURE 1 snaps the actuator slide arms 6 back against the minor diameter d of the left-hand pair of slide retainer spools 19, as viewed in FIGURE 8, which serve as a travel stop for slide 6. Next, the release cam actuating levers 20 attempt to return to the normal position, as shown in FIGURE 5, since these members are spring loaded by the release cam return spring 21. However, this return action is limited by the shoes 13 engaging the cable and the movement of levers 20 is interrupted as soon as the eccentric throw of the release cam 16 moves inboard enough to create a slight contact pressure between the lock shoes 13 and the brake actuator cable 1. The mechanism will remain in this state of readiness until the second event occurs. The second event is when forward linear motion viz. in a right-hand direction as viewed in FIGURES 2 and 8, is induced in the brake actuator cable 1 as the operator actuates a hand or foot operated lever (2 in FIGURE 1) to apply the vehicle emergency brake. Since a slight contact pressure exists, as noted above, the lock shoes 13 will travel with the cable 1 and continue to travel away from the stops 17 until the lock shoe lever arms 14 have moved to an angular position wherein the friction between the shoes 13 and the cable 1 is minimized to an extent that the cable then moves between and relative to the shoes toward brake setting position. As soon as this contact pressure or friction is thus reduced, the return spring pressure 21 forces the release cam actuating levers 20 back to the original position which in turn rotates the release cam 16 eccentric back to lock position. The brake mechanism will remain in this "lock poised" position until the operator pressure is removed from the brake actuating lever 2 and the linear motion of the tension loaded cable 1 attempts reverse travel.

In FIGURE 9, the powerful friction lock is shown being developed by squeeze action as the lock shoes 13 travel backwards with the brake actuating cable 1 and return against the stops provided by the heads 17a of bolts 17. The amount of this reverse travel is exaggerated for purposes of clarity in this view. The actual reverse cable travel which can be observed in the currently available prototype model is comparable to that which is incurred by the spacing of one ratchet tooth in the currently used devices.

While the form of control mechanism of my invention as shown is most suitable for actuating or controlling the emergency or parking brakes of a vehicle, it is to be understood that I contemplate the incorporation of my invention with any apparatus where it may be found to have utility. It is apparent that, within the scope of the invention, modifications and different arrangements may be made other than is herein disclosed, and the present disclosure is illustrative merely, the invention comprehending all variations thereof.

What I claim is:

1. Apparatus for controlling brake mechanism of a vehicle wherein a linear actuating member is connected with the brake mechanism including, in combination, a support, a relatively movable cam means mounted by the support, an arm mounted on the cam for movement relative thereto, a locking shoe operatively connected with said arm and arranged for engagement with the linear actuating member, means normally biasing said arm in a direction to establish engagement of said shoe with the linear actuating member, an actuating element connected with said cam to shift the cam, control means for said element, said element being movable in one direction to effect disengagement of the locking shoe with the linear actuating member, and means normally yieldingly biasing said actuating element in a direction urging the cam toward a position to effect gripping engagement of the locking shoe with the linear actuating member.

2. Apparatus for controlling brake mechanism of a vehicle wherein a cable is connected with the brake mechanism including, in combination, a support, a cam journally mounted by the support, a member mounted on the cam for movement relative thereto, a cable locking shoe operatively connected with said member and arranged for engagement with the brake actuating cable, means normally biasing said member in a direction to establish contact of said shoe with the cable, an actuating arm connected with said cam and movable therewith, control means for said arm including an element engaging said arm, said element being movable in one direction to shift the cam to a position effecting disengagement of the locking shoe with the cable, and means normally biasing said element in a direction to shift the cam to effect gripping engagement of the locking shoe with the cable.

3. Apparatus for controlling brake mechanism of a vehicle wherein a cable is connected with the brake mechanism including, in combination, a support, a cam movably mounted by the support, a member mounted on the cam for movement relative thereto, a cable locking shoe operatively connected with said member and arranged for engagement with the brake actuating cable, means normally biasing said member in a direction to establish contact of said shoe with the cable, an arm connected with said cam and movable therewith, control means for said arm including a bar for moving the arm and cam upon relative movement of the bar, a member operatively connected with said bar arranged to shift the bar for effecting release of the locking shoe from the cable, and means normally yieldably biasing the arm in a direction to position the cam to promote a locking engagement of the locking shoe with the cable.

4. Apparatus for controlling brake mechanism of a vehicle wherein a cable is connected with the brake mechanism including, in combination, a plate support, a pair of cams journally mounted by the support, a pair of cable locking shoes, a member engaging each of the cams and coupled to one of said locking shoes, resilient means connected to said members for normally yieldably biasing said locking shoes toward the cable, control means including arms connected with said cams, a relatively movable element arranged for operative contact with said arms, means normally biasing the arms in one direction, and means associated with said element for actuating the latter to shift said arms and said cams to a position effecting release of the locking shoes from the cable.

5. Apparatus for controlling brake mechanism of a vehicle wherein a cable is connected with the brake mechanism including, in combination, a plate support, a pair of cams journally mounted by the support, a pair of cable locking shoes movable toward and away from said cable, a member operably coupled between each cam and one of said locking shoes, resilient means normally yieldably biasing said locking shoes for engagement with the cable, control means for said locking shoes including arms connected with said cams to shift the same, a slide bar, means carried by said bar arranged for engagement with said arms, guide means for said slide bar, abutment means for limiting movement of said bar in one direction, a lever connected with said bar, said lever being adapted to be actuated to shift the bar and the arms to effect release of the locking shoes from the cable, and resilient means coupled to the arms normally yieldably biasing the arms in one direction.

6. Apparatus for locking a linearly movable member against movement in a predetermined direction, comprising: locking shoe means movable toward and away from said linearly movable member; rotary cam means operatively coupled to the locking shoe means to shift the same; resilient means normally yieldingly biasing said locking shoe means toward said linearly movable member; and actuating mechanism coupled to said cam means to rotate the same, said mechanism including a link connected to the cam means and a reciprocable arm coupled to the link to shift the link to a position rotating the cam to move the locking shoe means away from said linearly movable member; and spring means yieldably biasing said link to urge the cam means in a preselected direction.

7. Apparatus for locking a linearly movable member against movement in a given direction, comprising: a pair of locking shoes positioned in opposed confronting relationship for movement toward and away from said linearly movable member and adapted to lockingly grip said member therebetween; a rotary eccentric cam operably coupled to each locking shoe for shifting the same toward and away from said member; spring means yieldably biasing said locking shoes toward said member; and actuating mechanism for controlling the rotation of said cams, said mechanism including a rigid link connected to each cam, and a reciprocable arm coupled to the links to shift the latter conjointly; and spring means innerconnected between the links yieldably biasing the links toward a position urging the cams in a predetermined direction.

8. Apparatus for locking a linearly movable cable against movement in a predetermined direction, comprising: a support; a pair of rotary eccentric cams movably mounted on the support; a pair of locking shoes positioned in opposed confronting relation to lockingly grip the cable therebetween and movable toward and away from the cable; an arm connected to each locking shoe and coupled to one of said cams to transmit movement of said cam to its respective locking shoe; spring means coupled to said arms yieldably urging the locking shoes toward the cable; an actuating link coupled to each cam to shift the cam; a reciprocable bar positioned intermediate the links and contacting the links to actuate the cams upon movement of said bar; a lever connected to the bar to reciprocate the same; and second spring means connected to said links yieldably biasing the links to urge the cams toward a position engaging the locking shoes against the cable.

References Cited in the file of this patent

UNITED STATES PATENTS

| | | |
|---|---|---|
| 904,685 | Cunningham | Nov. 24, 1908 |
| 945,579 | Nitch | Jan. 4, 1910 |
| 2,295,381 | Bouton | Sept. 8, 1942 |
| 2,489,632 | Frieder | Nov. 29, 1949 |
| 2,664,015 | Moore | Dec. 29, 1953 |
| 2,796,956 | Hartke | June 25, 1957 |
| 2,819,406 | Frecking | Jan. 7, 1958 |
| 2,923,169 | Hinsey | Feb. 2, 1960 |